(No Model.)
W. S. LOVELL.
ANIMAL TRAP.
No. 441,677. Patented Dec. 2, 1890.
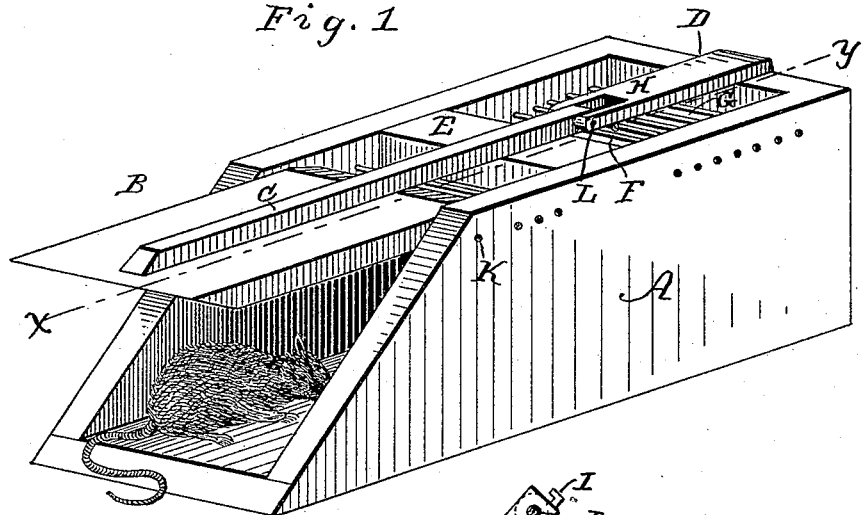
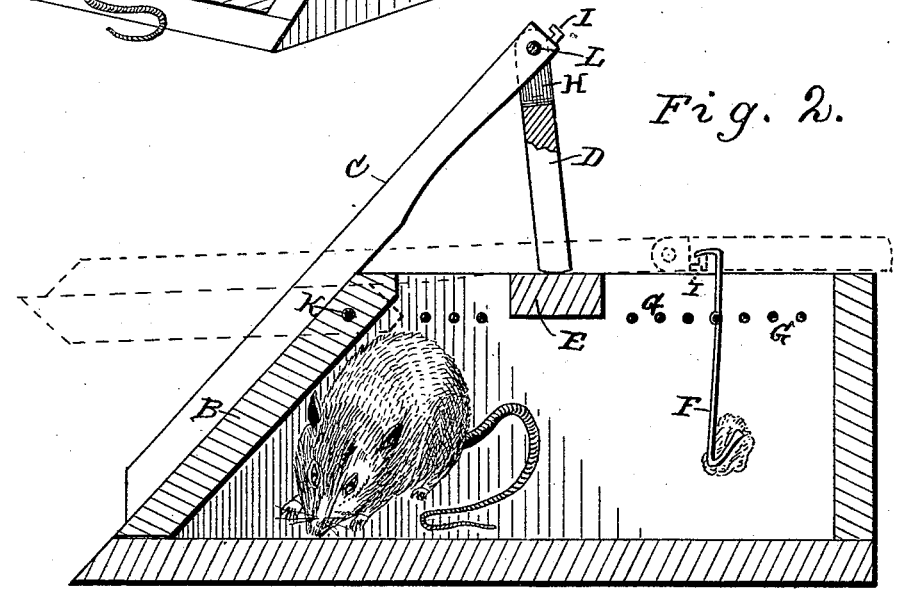
Witnesses.
Thos. Houghton.
Jno. B. Clark.
Inventor.
William S. Lovell
By D. C. The Knight
his Attorney.
THE NORRIS PETERS CO., PHOTO-LITHO., WASHINGTON, D. C.

UNITED STATES PATENT OFFICE.

WILLIAM S. LOVELL, OF CHARLESTON, WEST VIRGINIA.

ANIMAL-TRAP.

SPECIFICATION forming part of Letters Patent No. 441,677, dated December 2, 1890.

Application filed September 4, 1890. Serial No. 363,933. (No model.)

*To all whom it may concern:*

Be it known that I, WILLIAM S. LOVELL, a citizen of the United States, residing at Charleston, in the county of Kanawha and State of West Virginia, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of animal-traps which are composed of cages having self-locking doors; and it consists of a novel locking device for securing the door when the trap is sprung.

Figure 1 is a perspective view of a trap, showing the door open and the trap set, with my device attached. Fig. 2 is a longitudinal vertical section on the line $xy$ of Fig. 1, showing the trap sprung and the door securely locked.

In the figures, A is an animal-trap having the door B attached to the sides of the trap by pivots K, upon which it freely moves.

C is a lever attached to the door and extending above the top of the trap.

D is a prop or arm slightly longer than the vertical distance between the top of lever C and the top of the trap when the door is closed, having one end bifurcated at H, said bifurcated end being attached to the upper end of lever C by the pivots L, on which it moves freely.

I is a set-pin fixed in the upper end of lever C and projecting between the bifurcated arms of prop D to engage with the upper end of the bait-hook F.

E is a cross-piece attached to the top of the trap, upon which the prop D rests when the door is closed.

G G are the bars or wires which form the top of the trap.

The trap is set by pressing down the lever and engaging the bait-hook with the set-pin. It is sprung by disengaging the set-pin and bait-hook, whereupon the door falls by gravity, and the prop drops upon the cross-piece, where it rests at or about a perpendicular, thus securely locking the door against pressure from within the trap. The set-pin may be also attached to the prop between the bifurcations, or to the side of the lever, and the trap may be constructed with two or more doors, if desired.

Having thus fully described my invention, what I claim as new, and desire to secure by Letters Patent, is—

In an animal-trap, the combination of a pivoted door having a lever attached thereto and extending above the trap, with a prop pivoted to the upper end of the lever and resting on the top of the trap when the door is closed, substantially as described.

In testimony whereof I affix my signature in presence of two witnesses.

WILLIAM S. LOVELL.

Witnesses:
C. C. WATTS,
W. L. ASHBY.